(12) United States Patent
Ovadya

(10) Patent No.: US 9,646,016 B2
(45) Date of Patent: May 9, 2017

(54) METHODS CIRCUITS APPARATUSES SYSTEMS AND ASSOCIATED COMPUTER EXECUTABLE CODE FOR DATA DEDUPLICATION

(71) Applicant: 2MANDARINS LTD., Petach Tiqwa (IL)

(72) Inventor: Eran Ovadya, Petach Tiqwa (IL)

(73) Assignee: 2MANDARINS LTD., Petach Tiqwa (IL)

( * ) Notice: Subject to any disclaimer, the term of this patent is extended or adjusted under 35 U.S.C. 154(b) by 415 days.

(21) Appl. No.: 14/184,937

(22) Filed: Feb. 20, 2014

(65) Prior Publication Data

US 2015/0234853 A1    Aug. 20, 2015

(51) Int. Cl.
*G06F 17/00*      (2006.01)
*G06F 17/30*      (2006.01)
*H04L 12/58*      (2006.01)

(52) U.S. Cl.
CPC ........ *G06F 17/30156* (2013.01); *H04L 51/22* (2013.01)

(58) Field of Classification Search
CPC ............. G06F 21/6218; G06F 3/04842; G06F 17/30867; G06F 21/10; G06F 21/31; G06F 21/57
See application file for complete search history.

(56) References Cited

U.S. PATENT DOCUMENTS

2010/0332456 A1*    12/2010    Prahlad ............... G06F 17/3002
                                                                707/664

* cited by examiner

*Primary Examiner* — Truong Vo
(74) *Attorney, Agent, or Firm* — Vladirmir Sherman; Professional Patent Solutions

(57) ABSTRACT

Disclosed are methods, circuits, apparatuses, systems and associated computer executable code for data deduplication. An email data deduplication system includes an email server to send and receive emails and to store and retrieve emails from an email repository. The email data deduplication system further includes an email proxy to communicate with the email server, access one or more native repository data structures functionally associated with the email server, access one or more supplementary repository data storage resources, and parse an email being stored by the email server into a first email portion to be stored in one or more of the native repository data structures and a second email portion to be stored in one or more of the supplementary repository data storage resources.

12 Claims, 14 Drawing Sheets

METHODS CIRCUITS APPARATUSES SYSTEMS AND ASSOCIATED COMPUTER EXECUTABLE CODE FOR DATA DEDUPLICATION

FIELD OF THE INVENTION

The present invention relates generally to the fields of Data Storage and Data Repository Management. More specifically, the present invention relates to methods, circuits, apparatuses, systems and associated computer executable code for data and/or email-data deduplication.

BACKGROUND

In computing, data deduplication is a specialized data compression technique for eliminating duplicate copies of repeating data. Related and somewhat synonymous terms are intelligent (data) compression and single-instance (data) storage. This technique is used to improve storage utilization and can also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

Taking the above into account, there clearly remains a need, in the fields of Data and Email Storage and Data Repository Management, for better and more efficient systems and methods for data deduplication that may cluster storage resources as a unified, and possibly heterogeneous, repository while facilitating data deduplication, search, retrieval and updating.

SUMMARY OF THE INVENTION

The present invention includes methods, circuits, apparatuses, systems and associated computer executable code for data deduplication, wherein a common data element, present in each of a set of data items, for example email messages, is replaced with a link or pointer to a replicated single instance copy of the common data element.

According to some embodiments of the present invention, a system for email data deduplication may include an Email Proxy, functionally associated with an Email Server, comprising: (1) an Email Analyzing Logic for analyzing one or more email messages stored on a one or more Native Email Repository data structure(s) (Hereinafter: Native Email Repository(s)) of the Email Server and providing email messages parsing instructions to (2) an Email Processor for parsing the email and storing a first portion of the parsed email, including a Link/Pointer/Marker indicative of the storage location of a second portion of the email, on one or more Native Email Repositories of the Email Server, and the second portion of the email on one or more of the Native Email Repositories of the Email Server and/or one or more Supplementary Email Repository data storage resource(s) (Hereinafter: Supplementary Email Repository(s)).

According to some embodiments of the present invention, the Email Analyzing Logic of a system/email-server for data deduplication may include: (1) a Redundancy Detection Module to identify a common data element present in each of a set of data items; (2) a Replication Module to replicate and store a single instance copy of the common data element; and (3) a Data Element Replacement Module to embed into each of the data items in the set a link or pointer to the replicated single instance copy of the common data element, and delete the actual common data element from within each of the data items in the set.

According to some embodiments, the Email Processor of a system/email-sever for data deduplication may further include, and/or be functionally associated with: (4) a Native Repository Interface to store two or more data items (e.g. emails) on one or more Native Email Repository(s); and (5) a Supplementary Repository Interface to store a replicated single instance copy of the common data element identified in a set of some or all of the two or more data items (e.g. emails) stored on the Native Email Repository(s), on one or more Supplementary Email Repository(s). The Native and/or the Supplemental Repositories: may be integral or otherwise functionally associated, or networked, with some or all of the above described modules; may be proprietary or belong to a third party; and/or may be local or remote. Furthermore, the Native and/or the Supplementary Repositories may be of any database or data storage type or configuration, known today or to be devised in the future.

According to some embodiments, a system/email-server for data deduplication may further include: (6) a Reversion Module to retrieve and revert a previously replicated common data element into a user requested data item. The Reversion Module may use the link or pointer embedded into a previously containing 'common data element' data item, to locate and retrieve the replicated single instance copy of the 'common data element' from the Supplementary Repository(s). The retrieved common data element may then be reverted to the respective link/pointer embedded data item prior to its forwarding to the requesting user.

According to some embodiments of the present invention, a deduplication e-mail server may replicate, a common e-mail attachment present in each of a set of e-mails, and replace it with a link or pointer to the replicated copy.

According to some embodiments, a deduplication e-mail server may revert a previously replicated e-mail attachment into a user requested e-mail. The link or pointer embedded into the e-mail attachment containing e-mail may be deleted upon reversion of the attachment to the e-mail. According to some embodiments, as part of reverting an e-mail attachment to a requested e-mail, an inquiry (e.g. search Native Repository(s)) or a check (e.g. in an e-mail to replicated attachments reference table) as to whether additional e-mails still contain a link or pointer to the same e-mail attachment may be executed. Replicated single instance copies of e-mail attachments having no remaining e-mail link(s) or pointer(s) linking to them, may be deleted from the Supplementary Repository Area.

According to some embodiments of the present invention, the Replication Module may utilize indexing based data storage and retrieval techniques for the storage and retrieval of replicated copies of 'common data elements' identified by the Redundancy Detection Module, on/from the Second Repository Area. According to some embodiments, the value of the index, or storage/search key, may be calculated at least partially based on parameters derived from, or associated with, the 'common data item' being stored or retrieved.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
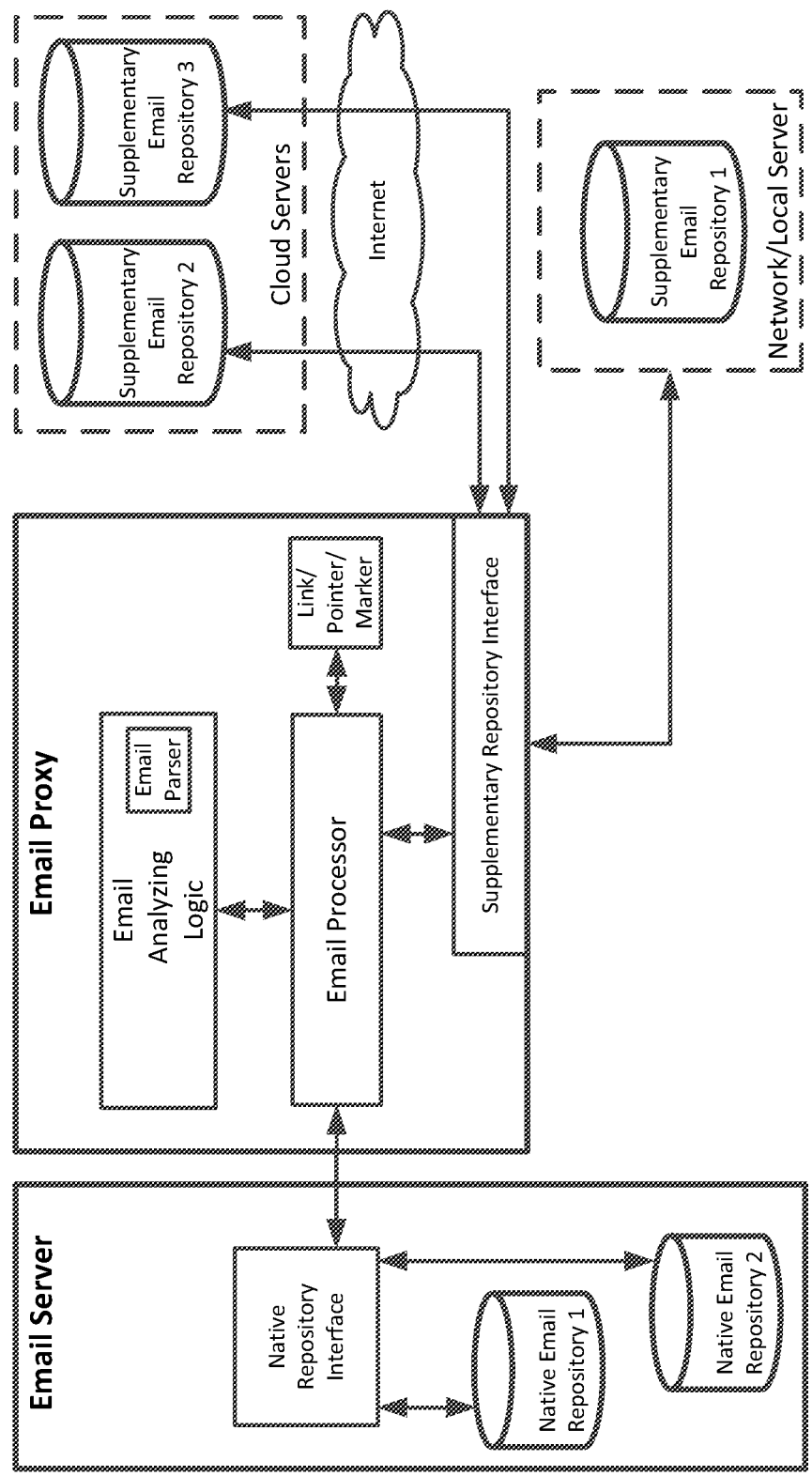
FIG. 1A is a functional block diagram of a general configuration of an exemplary system for email data deduplication, in accordance with some embodiments of the present invention, wherein a common data element, present in each of a set of emails, is replicated and replaced with a link or pointer to the replicated copy.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals, or titles, may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Furthermore, some of the processes and displays presented herein are described in the general context of emails and email servers, these however, are not inherently related to any particular computer, server, and/or email system. Additionally, throughout the specification discussions utilizing terms such as "common data", "common data element", "common attachment", "duplicative data", or the like, may refer to any two or more data items or data elements having, full or partial, similarity or resemblance to each other.

General

The present invention includes methods, circuits, apparatuses, systems and associated computer executable code for data deduplication, wherein a common data element, present in each of a set of data items, for example email messages, is replaced with a link or pointer to a replicated single instance copy of the common data element.

According to some embodiments of the present invention, a system for email data deduplication may include an Email Proxy, functionally associated with an Email Server, comprising: (1) an Email Analyzing Logic for analyzing one or more email messages stored on a one or more Native Email Repository data structure(s) (Hereinafter: Native Email Repository(s)) of the Email Server and providing email messages parsing instructions to (2) an Email Processor for parsing the email and storing a first portion of the parsed email, including a Link/Pointer/Marker indicative of the storage location of a second portion of the email, on one or more Native Email Repositories of the Email Server, and the second portion of the email on one or more of the Native Email Repositories of the Email Server and/or one or more Supplementary Email Repository data storage resource(s) (Hereinafter: Supplementary Email Repository(s)).

According to some embodiments, the process of analyzing and processing the one or more email messages may be triggered: intermittently, at predetermined time points, at predetermined time gaps, based on the amounts of received and/or stored and/or unanalyzed email messages, and/or based on one or more Email Proxy and/or Email Server operation related parameters.

According to some embodiments, the second portion of the email may be duplicative data, found in two or more of the email messages stored on a one or more Native Email Repositories.

In FIG. 1A there is shown, in accordance with some embodiments of the present invention, a functional block diagram of a general configuration of an exemplary system for email data deduplication wherein a second email portion including duplicative data such as a common data element, present in each of a set of emails, is stored to a Supplementary Email Repository and replaced with a link or pointer, to the replicated copy, in a first portion of the email stored to a Native Email Repository of the email server.

Figure 1B:
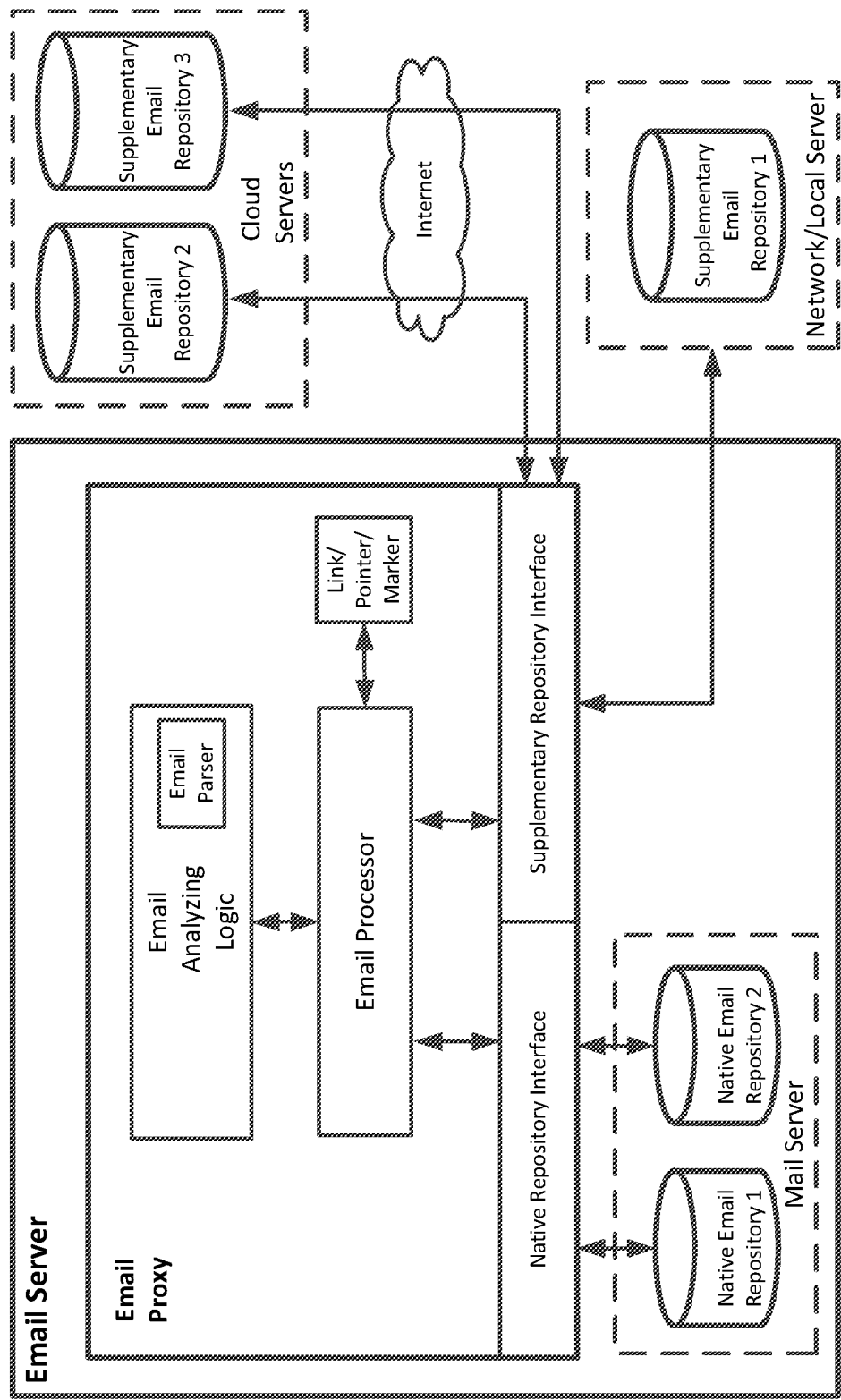
FIG. 1B is a functional block diagram of a general configuration of an exemplary email server including an email proxy for email data deduplication, in accordance with some embodiments of the present invention, wherein a common data element, present in each of a set of emails, is replicated and replaced with a link or pointer to the replicated copy.

In FIG. 1B there is shown, in accordance with some embodiments of the present invention, a functional block diagram of a general configuration of an exemplary email server including an email proxy for email data deduplication wherein a second email portion including duplicative data such as a common data element, present in each of a set of emails, is stored to a Supplementary Email Repository and replaced with a link or pointer, to the replicated copy, in a first portion of the email stored to a Native Email Repository of the email server.

Figure 1C:
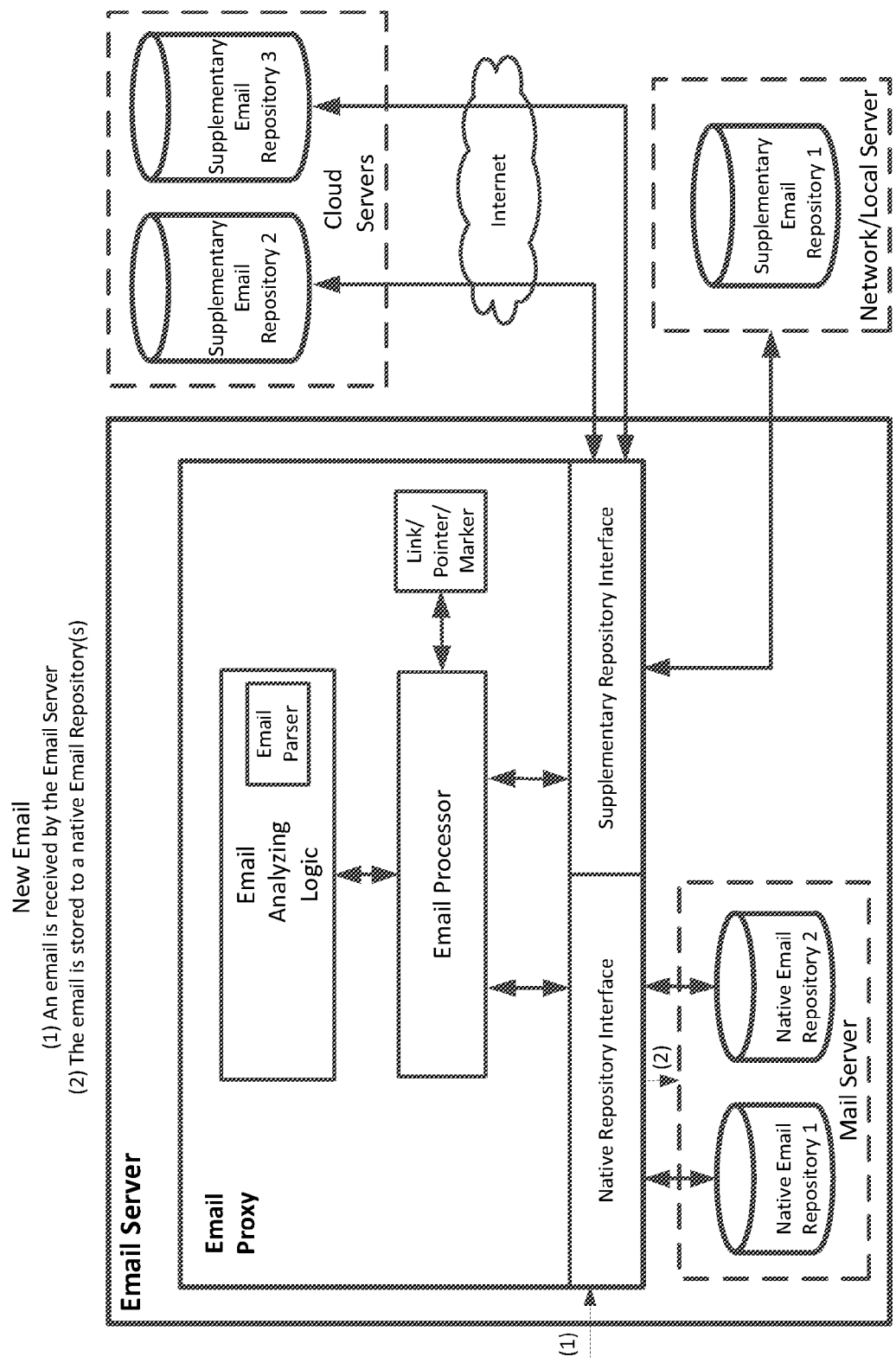
FIG. 1C is a functional block diagram of a general configuration of an exemplary email server including an email proxy for email data deduplication, in accordance with some embodiments of the present invention, wherein the receipt and storage of a new email message is exemplified.

In FIG. 1C there is shown, in accordance with some embodiments of the present invention, a functional block diagram of a general configuration of an exemplary email server including an email proxy for email data deduplication wherein: (1) an email is received by the Email Server; and (2) the email is stored to a native Email Repository(s) by a Native Repository Interface. According to some embodiments, the Native Repository Interface may be part of the Email Proxy (as shown) or may be part of, and partially or fully operated by, the Email Server—possibly with no intervention of the Email Proxy or components thereof.

Figure 1D:
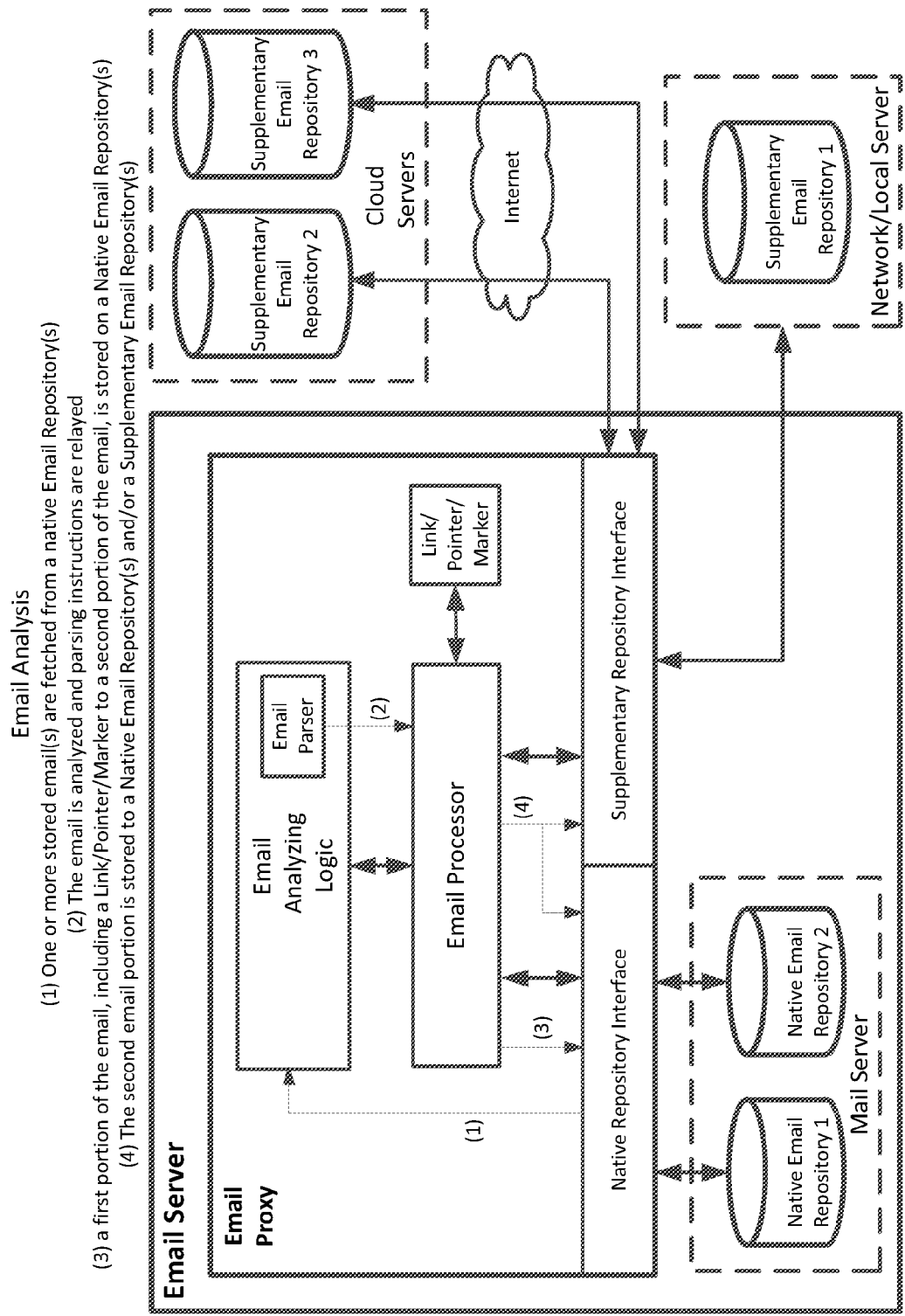
FIG. 1D is a functional block diagram of a general configuration of an exemplary email server including an email proxy for email data deduplication, in accordance with some embodiments of the present invention, wherein the analysis of an email message(s) is exemplified.

In FIG. 1D there is shown, in accordance with some embodiments of the present invention, a functional block diagram of a general configuration of an exemplary email server including an email proxy for email data deduplication wherein: (1) one or more stored email(s) are fetched from the native Email Repository(s) by the Native Repository Interface; (2) the email is analyzed and parsing instructions are relayed; (3) a first portion of the email, including a Link/Pointer/Marker to a second portion of the email, is stored on the Native Email Repository(s) by the Native Repository Interface; and (4) the second email portion is stored to the Native Email Repository(s) by the Native Repository Interface and/or a Supplementary Email Repository(s) by the supplementary Native Repository Interface.

Figure 1E:
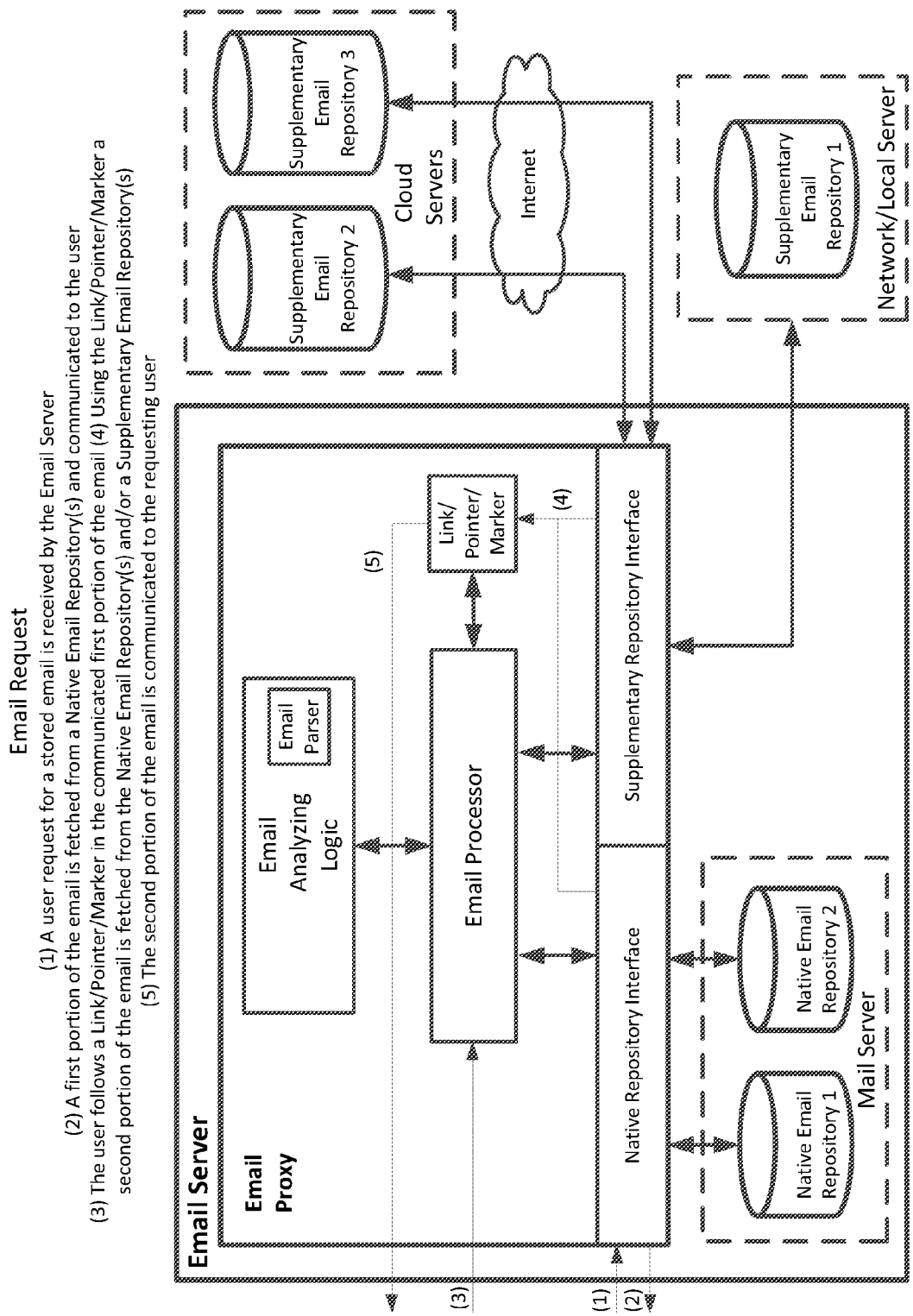
FIG. 1E is a functional block diagram of a general configuration of an exemplary email server including an email proxy for email data deduplication, in accordance with some embodiments of the present invention, wherein the processing of a request for a stored and analyzed email message is exemplified.

In FIG. 1E there is shown, in accordance with some embodiments of the present invention, a functional block diagram of a general configuration of an exemplary email server including an email proxy for email data deduplication wherein: (1) a user request for a stored email is received by the Email Server; (2) a first portion of the email is fetched from the Native Email Repository(s) and communicated to the user; (3) the user follows a Link/Pointer/Marker in the communicated first portion of the email; (4) using the Link/Pointer/Marker a second portion of the email is fetched from the Native Email Repository(s) and/or from the Supplementary Email Repository(s); and (5) the second portion of the email is communicated to the requesting user.

According to some embodiments of the present invention, the Email Analyzing Logic of a system/email-server for data deduplication may include: (1) a Redundancy Detection Module to identify a common data element present in each of a set of data items; (2) a Replication Module to replicate and store a single instance copy of the common data element; and (3) a Data Element Replacement Module to embed into each of the data items in the set a link or pointer to the replicated single instance copy of the common data element, and delete the actual common data element from within each of the data items in the set.

According to some embodiments, the Email Processor of a system/email-sever for data deduplication may further include, and/or be functionally associated with: (4) a Native Repository Interface to store two or more data items (e.g. emails) on one or more Native Email Repository(s); and (5) a Supplementary Repository Interface to store a replicated single instance copy of the common data element identified in a set of some or all of the two or more data items (e.g. emails) stored on the Native Email Repository(s), on one or more Supplementary Email Repository(s). The Native and/or the Supplemental Repositories: may be integral or otherwise functionally associated, or networked, with some or all of the above described modules; may be proprietary or belong to a third party; and/or may be local or remote.

Furthermore, the Native and/or the Supplementary Repositories may be of any database or data storage type or configuration, known today or to be devised in the future.

Figure 2A:
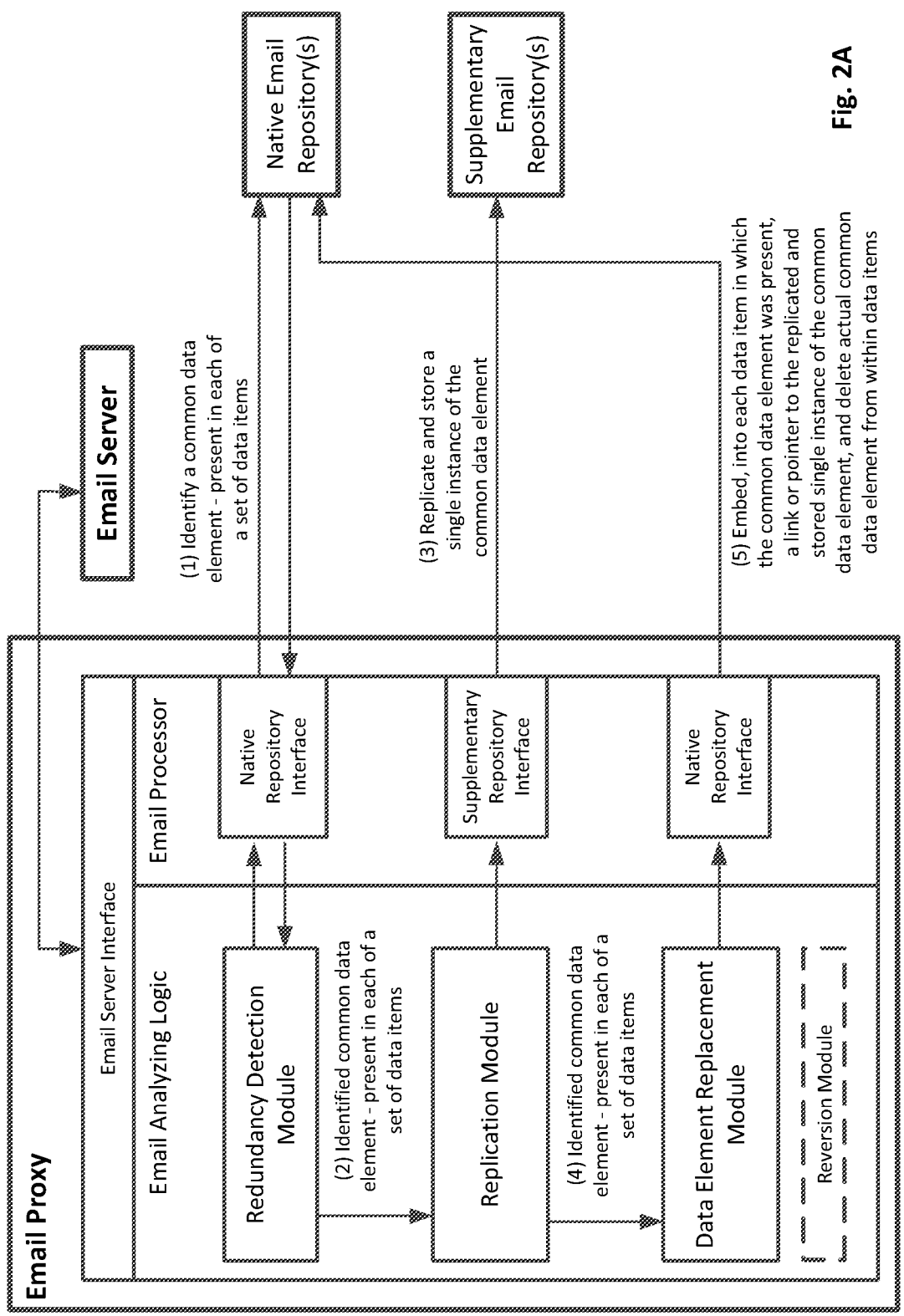
FIG. 2A is a functional block diagram of a general configuration of an exemplary system for email data deduplication, in accordance with some embodiments of the present invention, wherein a common data element, present in each of a set of data items, is replicated and replaced with a link or pointer to the replicated copy.

In FIG. 2A there is shown, a functional block diagram of a general configuration of an exemplary system for data deduplication, in accordance with some embodiments of the present invention. A common data element, present in each of a set of data items in the Native Repository(s), is identified by the Redundancy Detection Module and relayed to the Replication Module.

The Replication Module replicates and stores a single instance copy of the identified common data element in the Supplementary Repository(s), and relays the common data element, data related thereto such as one or more of its attributes/characteristics (e.g. opening/closing characters, string length), and/or data related to the storage of its replicated single instance (e.g. Supplementary Repository storage location/address indicative data).

Based on the data relayed by the Replication Module, the Data Element Replacement Module embeds, into each data item in which the common data element was present, a link or pointer to the replicated and stored single instance of the common data element, and deletes actual common data element from within data items.

According to some embodiments, a system/email-server for data deduplication may further include: (6) a Reversion Module to retrieve and revert a previously replicated common data element into a user requested data item. The Reversion Module may use the link or pointer embedded into a previously containing 'common data element' data item, to locate and retrieve the replicated single instance copy of the 'common data element' from the Supplementary Repository(s). The retrieved common data element may then be reverted to the respective link/pointer embedded data item prior to its forwarding to the requesting user.

According to some embodiments, the link or pointer embedded into a 'common data element' containing data item may be deleted upon reversion of the 'common data element' to the data item. According to some embodiments, as part of reverting a 'common data element' to a requested data item, the Reversion Module may inquire (e.g. search Native Repository(s)) or check (e.g. a data item(s) to replicated 'common data elements' reference table) whether additional data items still contain a link or pointer to the same 'common data element'. Replicated single instance copies of 'common data elements' having no remaining data item link(s) or pointer(s) linking to them, may be deleted from the Supplementary Repository Area.

Figure 2B:
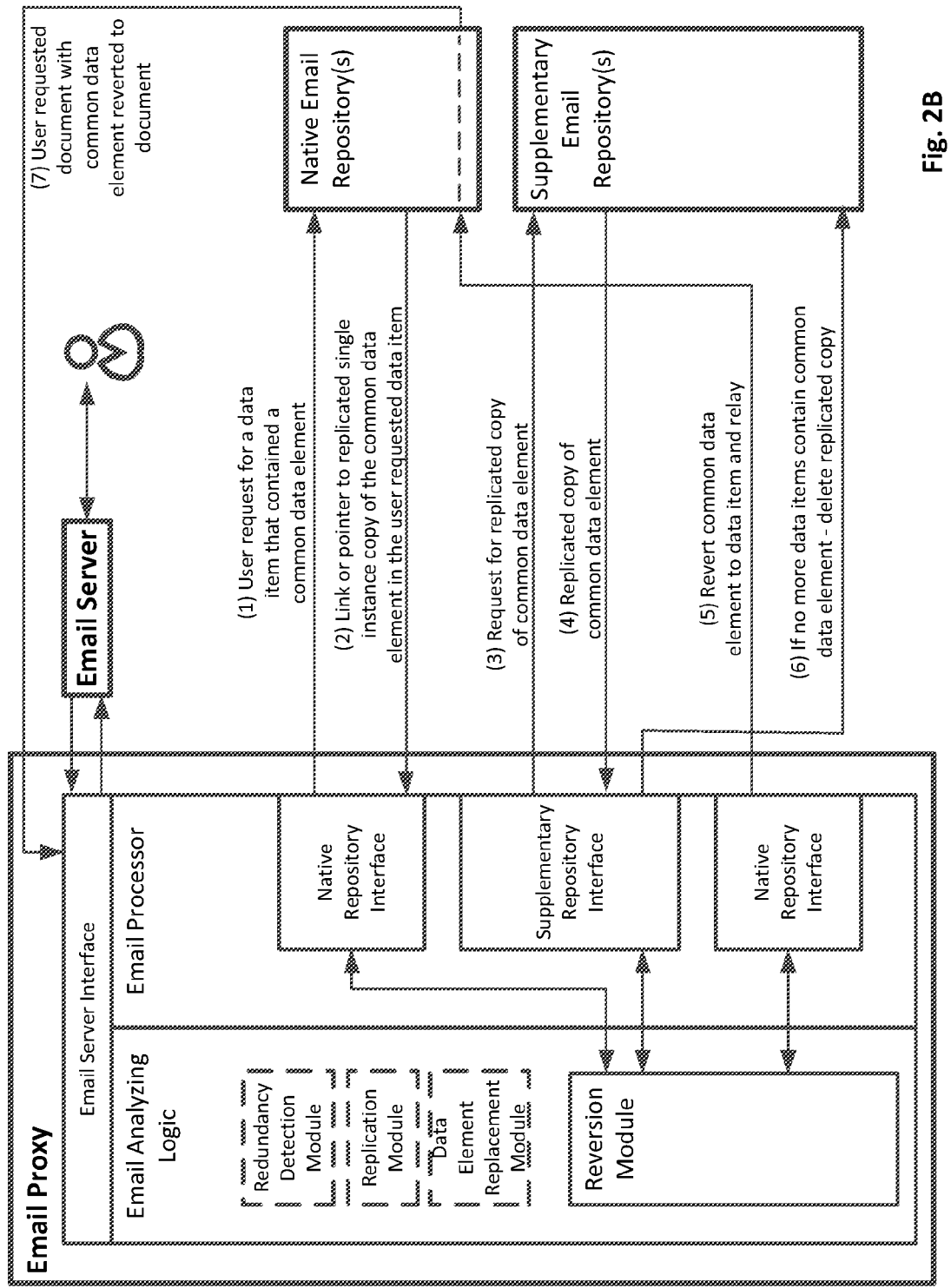
FIG. 2B is a functional block diagram of a general configuration of an exemplary system for email data deduplication, in accordance with some embodiments of the present invention, wherein a previously replicated common data element, is retrieved and reverted into a user requested data item.

In FIG. 2B there is shown, a functional block diagram of a general configuration of an exemplary System for data deduplication, in accordance with some embodiments of the present invention, wherein a previously replicated common data element, is retrieved and reverted into a user requested data item. Upon receipt of a user request for a data item from the Native Repository(s) that contained a common data element; the link or pointer, in the user requested data item, to the replicated single instance copy of the common data element, is used by the Reversion Module to request and retrieve the replicated copy of the common data element from the Supplementary Repository(s). The Reversion Module then reverts the common data element to the requested data item and relays to the user. If no more data items contain links or pointers to the reverted common data element, its replicated copy is deleted.

According to some embodiments of the present invention, the detection, replication and/or replacement of a common data element may be dynamically triggered, for example—once a threshold number, or data volume, of new data items is added to the Native Repository Area(s). According to some embodiments, the detection, replication and/or replacement of a common data element may be intermittently triggered, for example—at user predefined times, periodically every certain fixed time period, and/or when computational resources allow. According to some embodiments, the detection, replication, replacement and/or reversion of a common data element may be computer resources, and/or environmental parameters, conditioned; for example—only triggered when system's available RAM or CPU resources reach or accede a certain threshold, only triggered when the temperature at the vicinity of the system is below a threshold level.

E-mail Server

According to some embodiments of the present invention, a deduplication e-mail server may replicate, a common e-mail attachment present in each of a set of e-mails, and replace it with a link or pointer to the replicated copy.

Figure 3A:
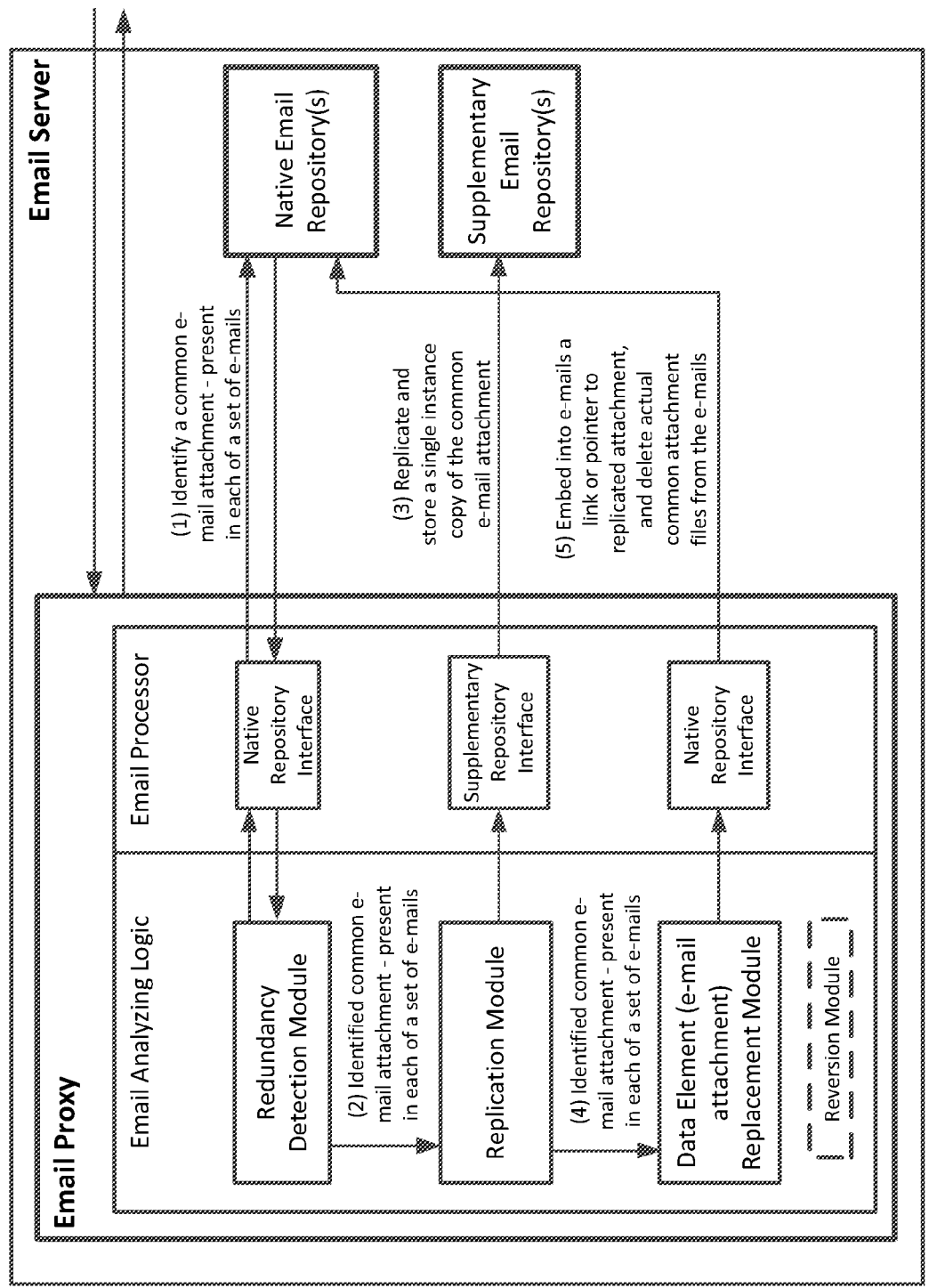
FIG. 3A is a functional block diagram of a general configuration of an exemplary deduplication e-mail server, in accordance with some embodiments of the present invention, wherein a common e-mail attachment, present in each of a set of e-mails, is replicated and replaced with a link or pointer to the replicated copy.

In FIG. 3A there is shown, a functional block diagram of a general configuration of an exemplary deduplication e-mail server, in accordance with some embodiments of the present invention. A common e-mail attachment, present in each of a set of e-mails in the Native Repository(s), is identified by the Redundancy Detection Module and relayed to the Replication Module.

The Replication Module replicates and stores a single instance copy of the identified e-mail attachment in the Supplementary Repository(s), and relays the common e-mail attachment, data related thereto such as one or more of its attributes/characteristics (e.g. opening/closing characters, string length), and/or data related to the storage of its replicated single instance (e.g. Supplementary Repository(s) storage location/address indicative data).

Based on the data relayed by the Replication Module, the Data Element (e-mail attachment) Replacement Module embeds, into each e-mail in which the common e-mail attachment was present, a link or pointer to the replicated and stored single instance copy of the e-mail attachment, and deletes actual attachment from within the e-mails.

According to some embodiments, a deduplication e-mail server may revert a previously replicated e-mail attachment into a user requested e-mail. The link or pointer embedded into the e-mail attachment containing e-mail may be deleted upon reversion of the attachment to the e-mail. According to some embodiments, as part of reverting an e-mail attachment to a requested e-mail, an inquiry (e.g. search Native Repository(s)) or a check (e.g. in an e-mail to replicated attachments reference table) as to whether additional e-mails still contain a link or pointer to the same e-mail attachment may be executed. Replicated single instance copies of e-mail attachments having no remaining e-mail link(s) or pointer(s) linking to them, may be deleted from the Supplementary Repository Area.

Figure 3B:
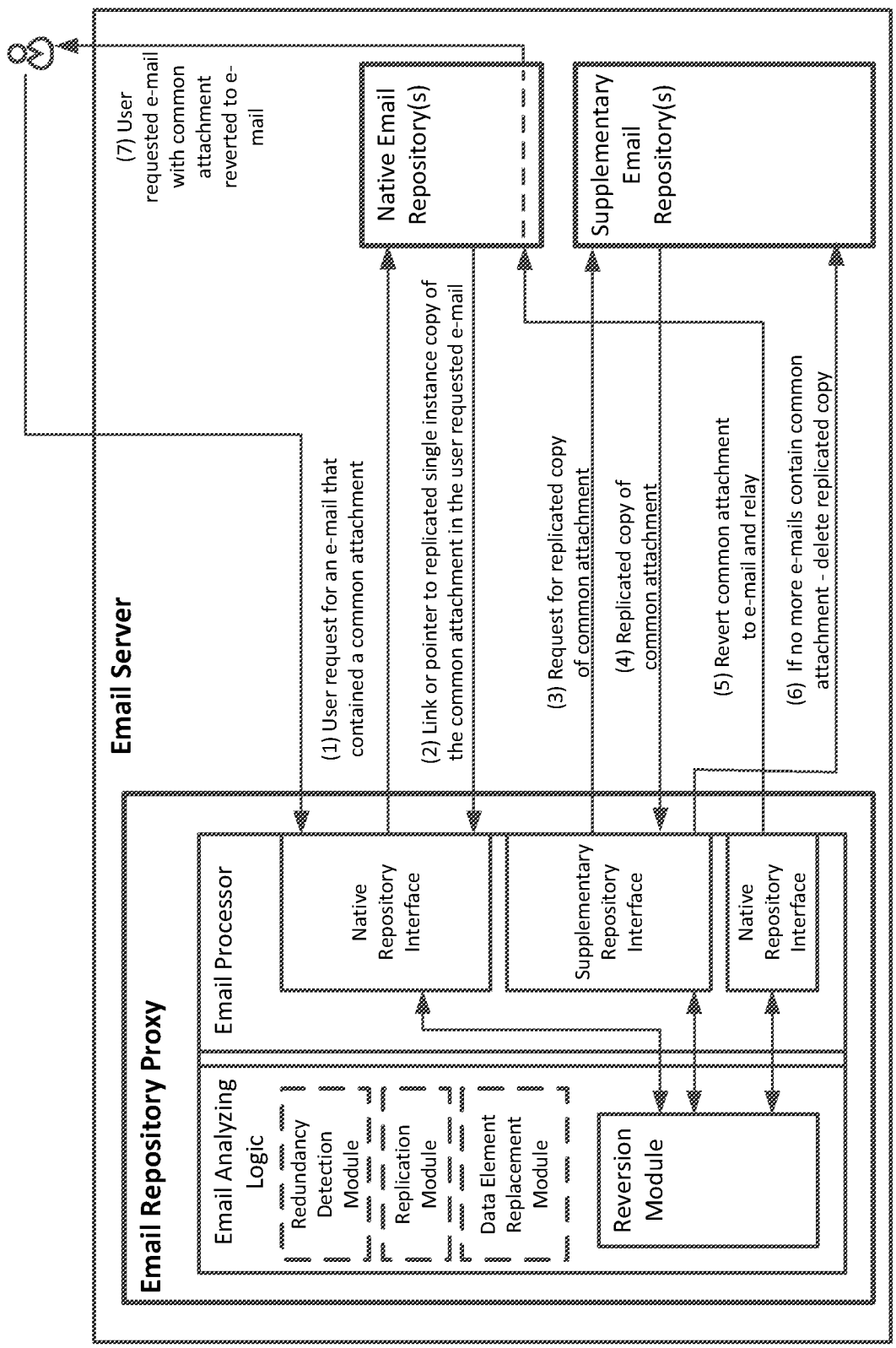
FIG. 3B is a functional block diagram of a general configuration of an exemplary system for data deduplication, in accordance with some embodiments of the present invention, wherein a previously replicated common e-mail attachment, is retrieved and reverted into a user requested e-mail.

In FIG. 3B there is shown, a functional block diagram of a general configuration of an exemplary deduplication e-mail server, in accordance with some embodiments of the present invention, wherein a previously replicated e-mail attachment, is retrieved and reverted into a user requested e-mail. Upon receipt of a user request for an e-mail from the Native Repository(s) that contained a common e-mail attachment; the link or pointer, in the user requested e-mail, to the replicated single instance copy of the common data element, is used by the Reversion Module to request and retrieve the replicated copy of the common e-mail attachment from the Supplementary Repository Area. The Reversion Module then reverts the common e-mail attachment to the requested e-mail and relays to the user. If no more e-mails contain links or pointers to the reverted common e-mail attachment, its replicated copy is deleted.

Indexed Storage and Retrieval

According to some embodiments of the present invention, the Replication Module may utilize indexing based data storage and retrieval techniques for the storage and retrieval of replicated copies of 'common data elements' identified by the Redundancy Detection Module, on/from the Second Repository Area. According to some embodiments, the value of the index, or storage/search key, may be calculated at least partially based on parameters derived from, or associated with, the 'common data item' being stored or retrieved.

According to some embodiments, a Replication Module, of a deduplication e-mail server, may utilize indexing based data storage and retrieval, and may calculate 'common e-mail attachment' storage and retrieval index values, at least partially based on parameters derived from, or associated with, the 'common e-mail attachment' being stored or retrieved.

Figure 4A:
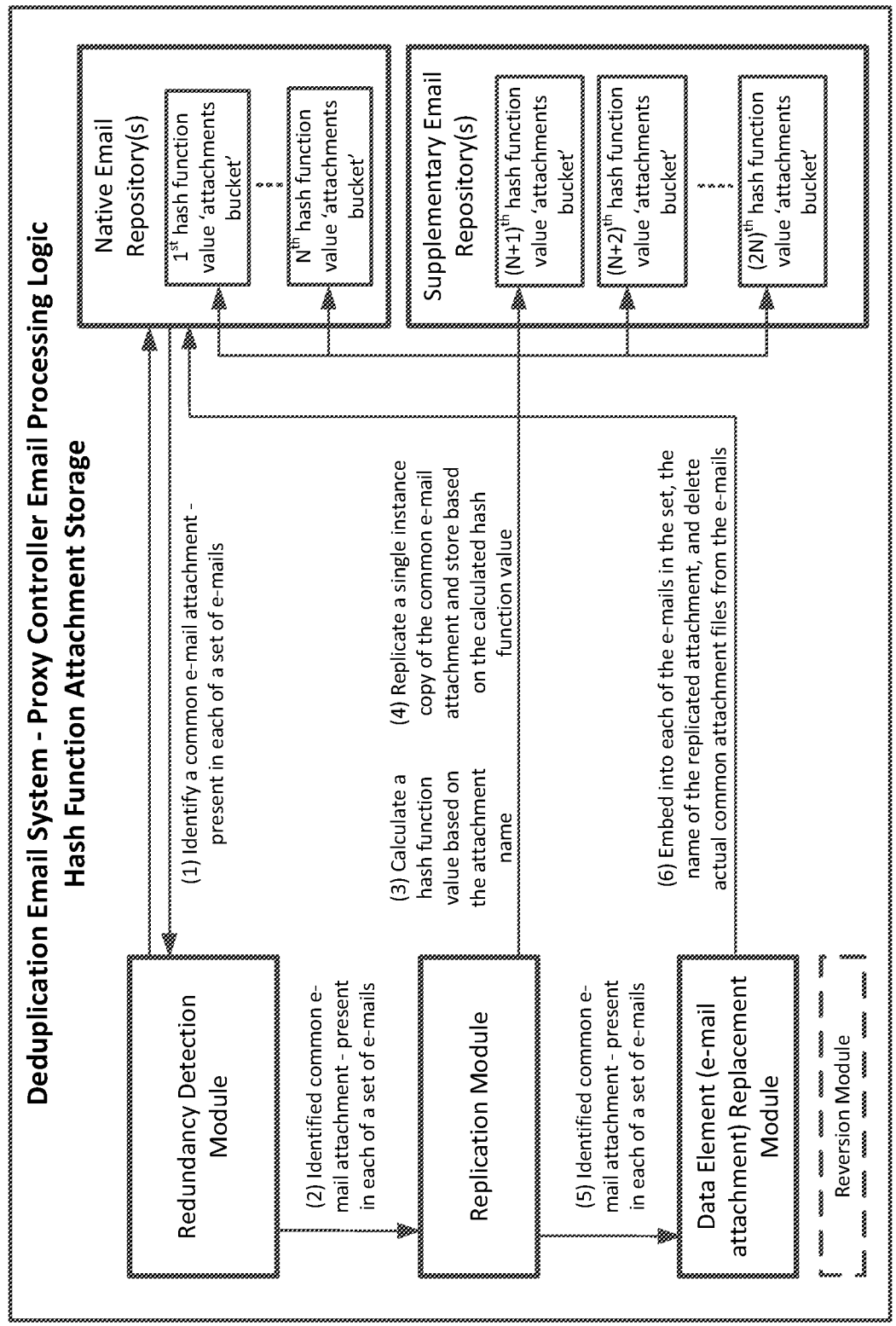
FIG. 4A is a functional block diagram of a general configuration of an exemplary deduplication e-mail server, in accordance with some embodiments of the present invention, wherein a common e-mail attachment, present in each of a set of e-mails, is replicated, and stored using a hash index function value, calculated based on the name of the common e-mail attachment.

In FIG. 4A, there is shown, a functional block diagram of a general configuration of an exemplary deduplication e-mail server, in accordance with some embodiments of the present invention, wherein a common e-mail attachment, present in each of a set of e-mails, is replicated, and stored using a hash index function value, calculated based on the name of the common e-mail attachment or parameters derived there from. Common e-mail attachments are stored on the Supplementary Repository(s) in 'attachment buckets' corresponding to hash function value(s), wherein the hash function factors parameters derived from the name of the common e-mail attachment. The name of the common e-mail attachment is embedded into each of the e-mails in the set for later access and/or retrieval.

Figure 4B:
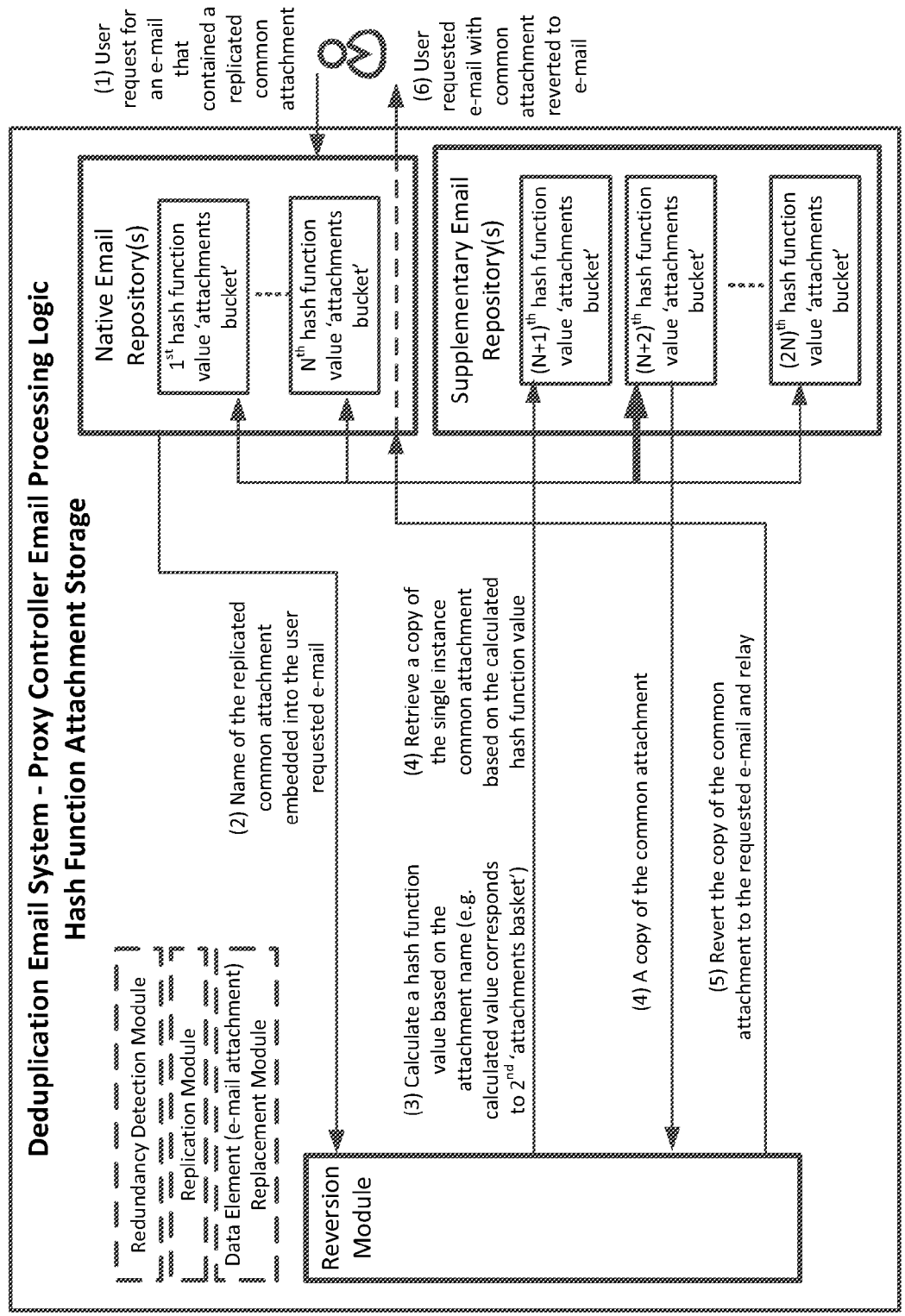
FIG. 4B is a functional block diagram of a general configuration of an exemplary system for data deduplication, in accordance with some embodiments of the present invention, wherein a previously replicated common e-mail attachment, is accessed and retrieved using a hash index function value, calculated based on the name of the common e-mail attachment, and reverted into a user requested e-mail.

FIG. 4B, there is shown, a functional block diagram of a general configuration of an exemplary system for data deduplication, in accordance with some embodiments of the present invention; wherein a previously replicated and stored common e-mail attachment, is accessed and retrieved using a hash index function value, calculated based on the name of the common e-mail attachment or parameters derived there from, before being reverted into a user requested e-mail. Common e-mail attachments are retrieved from the Supplementary Repository(s) 'attachment buckets' based on a calculation of the hash function value(s) and access of the corresponding 'attachment bucket', wherein the hash function factors parameters derived from the name of the common e-mail attachment previously embedded into the currently requested e-mail.

Repository Status Examples and Process Flow

Figure 5B:
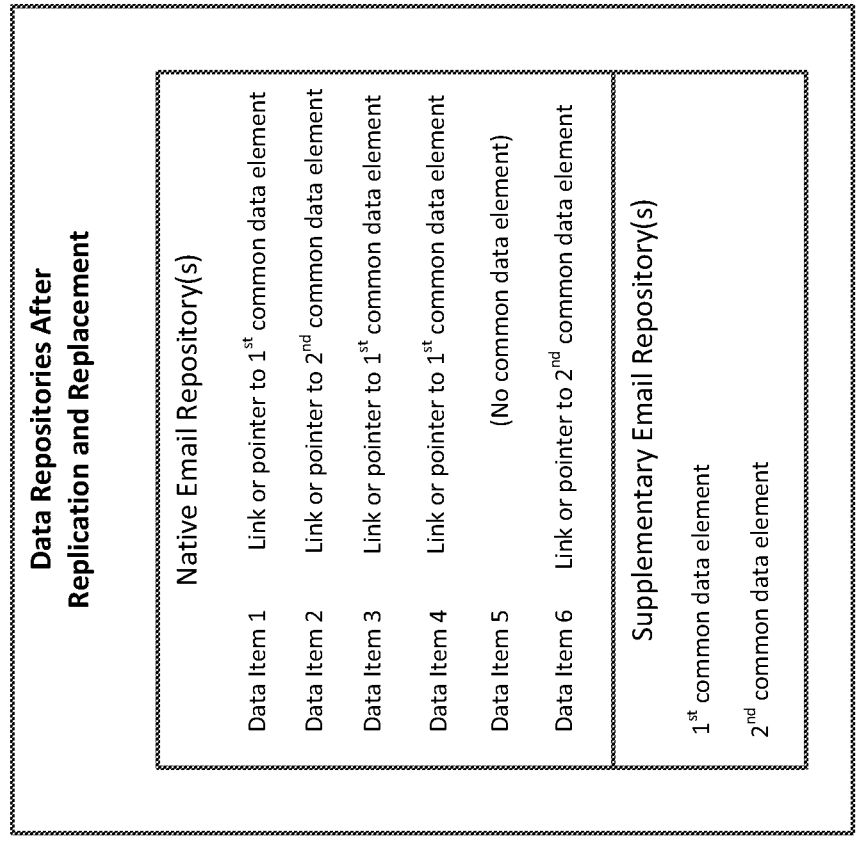
FIGS. 5A and 5B are schematic block diagrams showing the status of a data item repository, of an exemplary system for data deduplication, prior to (5A) and after (5B) replication and replacement of a common data element, in accordance with some embodiments of the present invention.
Figure 5A:
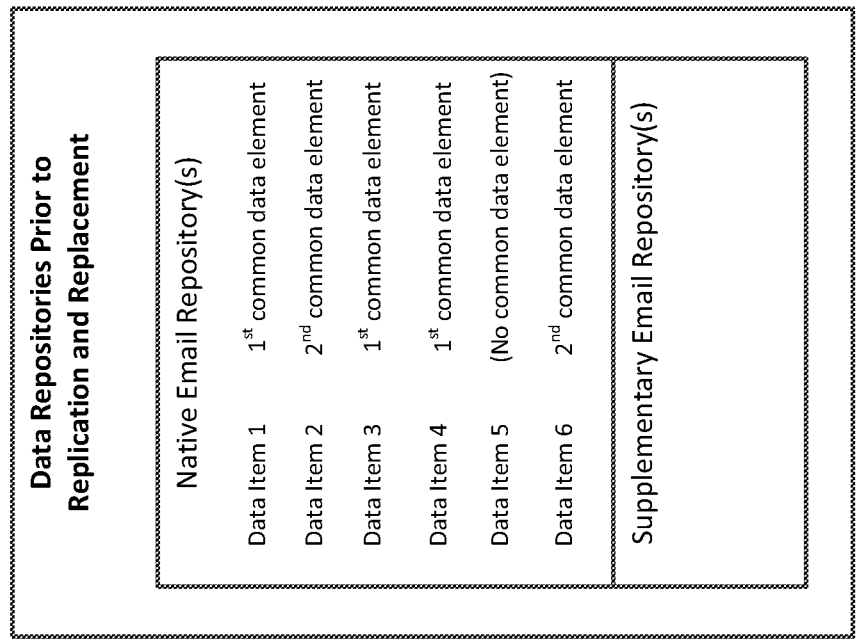

FIGS. 5A and 5B are schematic block diagrams showing the status of data repositories, of an exemplary system for data deduplication, prior to (5A) and after (5B) replication and replacement of a common data element, in accordance with some embodiments of the present invention. In FIG. 5A all data items, and the common data element of each data item, are stored on the Native Repository(s). In FIG. 5B common data elements stored on the Native Repository(s) have been replaced with links or pointers to replicated single instance copies of the common data elements, stored on the Supplementary Repository(s).

Figure 6A:
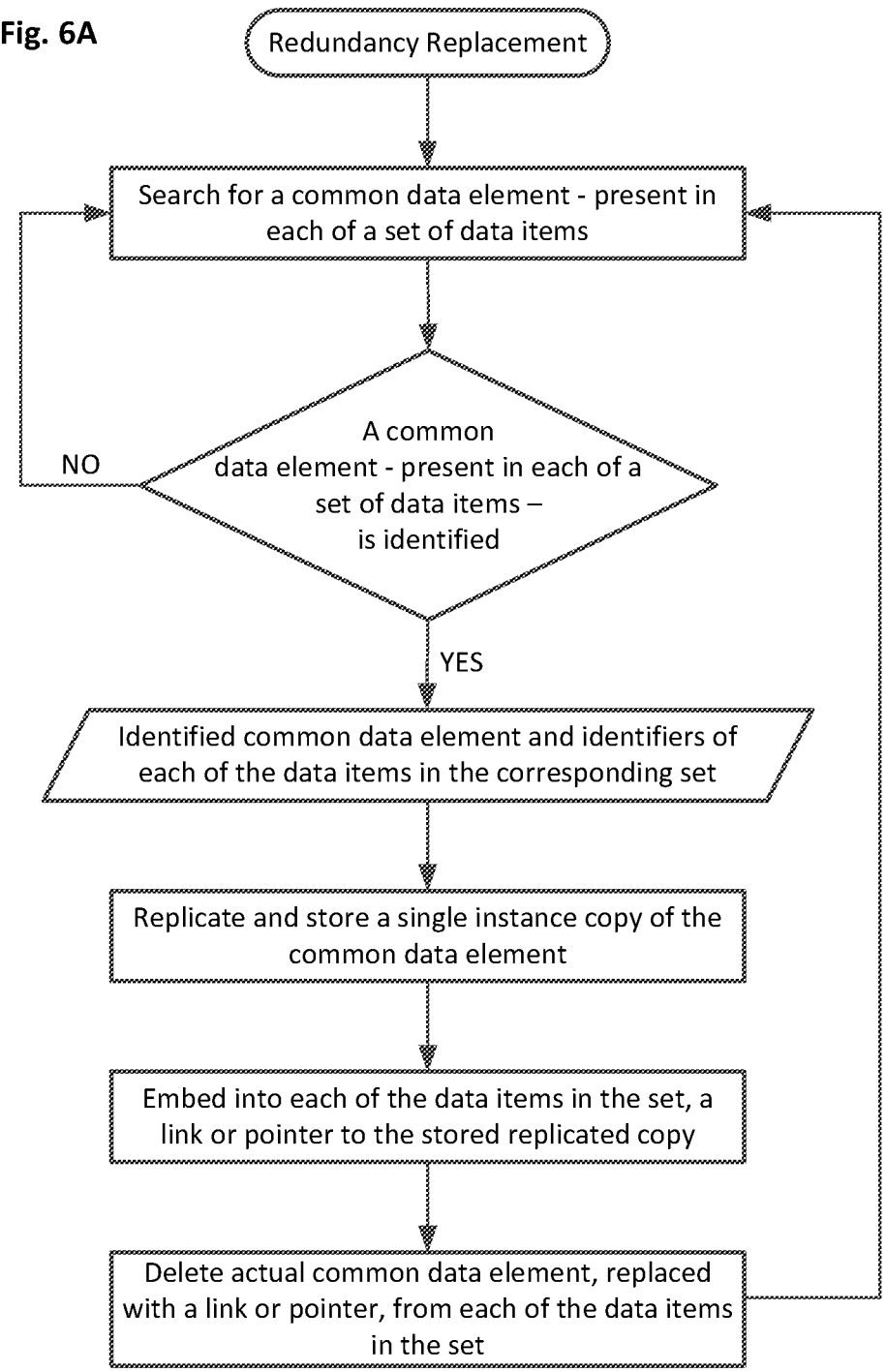
FIG. 6A is a flowchart showing the main steps executed by an exemplary system for data deduplication, as part of replicating and replacing a common data element, in accordance with some embodiments of the present invention.

FIG. 6A is a flowchart showing the main steps executed by an exemplary system/email-server for data deduplication, as part of replicating and replacing a common data element, in accordance with some embodiments of the present invention.

Figure 6B:
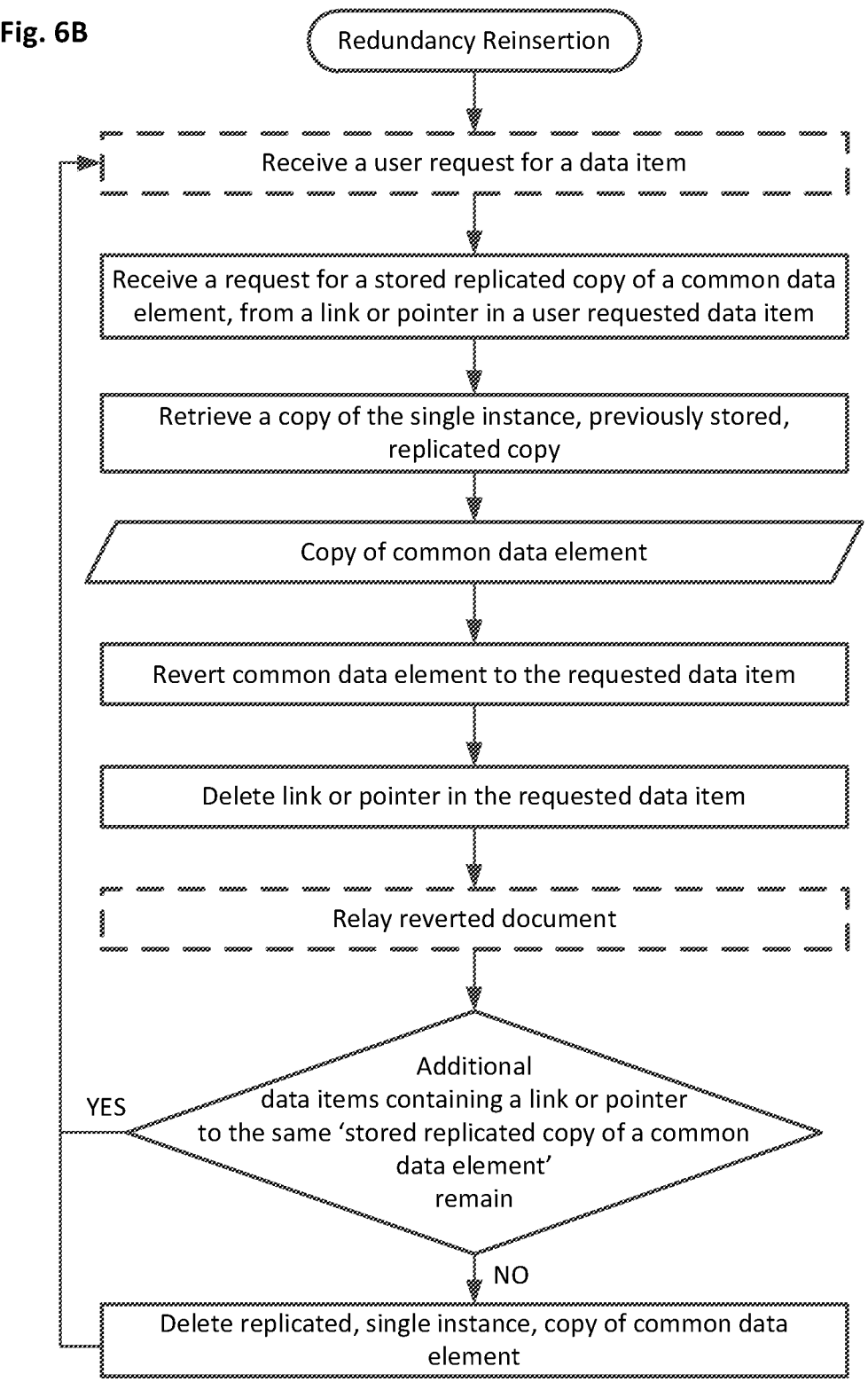
FIG. 6B is a flowchart showing the main steps executed by an exemplary system for data deduplication, as part of retrieving and reverting a common data element, in accordance with some embodiments of the present invention.

FIG. 6B is a flowchart showing the main steps executed by an exemplary system/email-server for data deduplication, as part of retrieving and reverting a common data element, in accordance with some embodiments of the present invention.

According to some embodiments of the present invention, an email server may comprise: an email communication interface to send and receive emails communicated to said email server; and an email repository proxy to store and retrieve received emails to and from an email repository, including: (1) a native email repository interface to access one or more native repository data structures functionally associated with said email server, (2) a supplementary email repository interface to access one or more supplementary repository data storage resources, and (3) an email analyzing logic adapted to parse an email stored by said email server into a first email portion to be stored in one or more of the native repository data structures and a second email portion to be stored in one or more of the supplementary repository data storage resources.

According to some embodiments, the second email portion may be duplicative data. According to some embodiments, the second email portion may be stored or identified in a supplementary data storage resource. According to some embodiments, the email repository proxy may further include an email processing and storage controller adapted to insert a marker in the first email portion indicating storage location of the second email portion. According to some embodiments, the marker in the first email portion indicating storage location of the second email portion may be an index function value. According to some embodiments, the email analyzing logic may further comprise: a redundancy detection module adapted to identify a common/duplicative data element present in each of a set of emails received by said email server; a replication module adapted to replicate a copy of the common/duplicative data element for storage on one or more of the supplementary repository data storage resources; and a data element replacement module adapted to replace an instance of the common/duplicative data element, within at least one of the emails in the set, with a link/pointer/marker to the replicated copy. According to some embodiments, the common/duplicative data element may be an email attachment.

According to some embodiments of the present invention, an email system may comprise: an email server adapted to send and receive emails, and further adapted to store and retrieve emails from an email repository; and an email repository proxy including: (1) an email server interface to communicate with the email server, (2) a native email repository interface to access one or more native repository data structures functionally associated with the email server, (3) a supplementary email repository interface to access one or more supplementary repository data storage resources, and (4) an email analyzing logic adapted to parse an email being stored by said email server into a first email portion to be stored in one or more of the native repository data structures and a second email portion to be stored in one or more of the supplementary repository data storage resources.

According to some embodiments, the second email portion may be duplicative data. According to some embodiments, the second email portion may be stored or identified in a supplementary data storage resource. According to some embodiments, the email repository proxy further includes an email processing and storage controller adapted to insert a marker in the first email portion indicating storage location of the second email portion. According to some embodiments, the marker in the first email portion indicating storage location of the second email portion may be an index function value. According to some embodiments, the email analyzing logic may further comprise: a redundancy detection module adapted to identify a common/duplicative data element present in each of a set of emails received by said email server, a replication module adapted to replicate a copy of the common/duplicative data element for storage on one or more of the supplementary repository data storage resources, and a data element replacement module adapted to replace an instance of the common/duplicative data element, within at least one of the emails in the set, with a link/pointer/marker to the replicated copy. According to some embodiments, the common/duplicative data element may be an email attachment.

According to some embodiments of the present invention, a method for storing and retrieving emails may comprise: parsing an email received by an email server into a first email portion and a second email portion; storing the first email portion in one or more functionally associated native repository data structures; and storing the second email portion in one or more supplementary repository data storage resources. According to some embodiments, the second email portion may be duplicative data. According to some embodiments, the second email portion may be stored or identified in a supplementary data storage resource. According to some embodiments, the method for storing and retrieving emails may further comprise: inserting a marker in the first email portion indicating storage location of the second email portion. According to some embodiments, the marker in the first email portion indicating storage location of the second email portion may be an index function value. According to some embodiments, the method for storing and retrieving emails may further comprise: identifying a common/duplicative data element present in each of a set of emails received by the email server, replicating a copy of the common/duplicative data element for storage on one or more of the supplementary repository data storage resources, and replacing an instance of the common/duplicative data element, within at least one of the emails in the set, with a link/pointer/marker to the replicated copy. According to some embodiments, the common/duplicative data element may be an email attachment.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. An email server comprising:
    a server including:
        an email communication interface to send and receive emails communicated to said email server;
        a data storage including: (a) a native email repository to store the sent and received emails; and (b) a supplementary repository divided into attachment buckets to store email attachments, the attachment buckets being data storing structures designed to store email attachments in an indexed manner and
        an email proxy including an email processor adapted to:
            (i) parse emails stored within said native email repository into a first portion and a second portion, the second portion being an email attachment;
            (ii) identify common email attachments present in multiple emails within said native email repository;
            (iii) store copies of the identified common email attachments within the attachment buckets in the indexed manner;
            (iv) delete the common email attachments from the multiple emails; and
            (v) embed, within the multiple emails, pointers to the copies of the identified common email attachments stored in the attachment buckets.

2. The email server according to claim 1, wherein the second email portion is duplicative data.

3. The email server according to claim 1, wherein said pointers include an identifier of an attachment bucket.

4. The email server according to claim 3, wherein said pointers each include an index function value.

5. The email server according to claim 1, wherein said pointers each include a hash function value.

6. The email server according to claim 5, wherein each of said pointers includes a hash function value derived from a name of an email attachment replaced by the pointer.

7. A method for storing emails comprising:
    parsing emails, stored within a native email repository of a data storage of an email server, into a first email portion and a second email portion, the second portion being an email attachment;
    identifying, using an email processor of the email server, common email attachments present in multiple emails within said native email repository;
    storing copies of the identified common email attachments within attachment buckets in an indexed manner, the attachment buckets being data storing structures within the data storage of the email server deleting the common email attachments from the multiple emails; and
    embedding, within the multiple emails, pointers to the copies of the identified common email attachments stored in the attachment buckets.

8. The method according to claim 7, wherein the second email portion is duplicative data.

9. The method according to claim 7, wherein said pointers include an identifier of an attachment bucket.

10. The method according to claim 7, wherein said pointers each include an index function value.

11. The method according to claim 7, said pointers each include a hash function value.

12. The method according to claim 11, wherein each of said pointers includes a hash function value derived from a name of an email attachment replaced by the pointer.

* * * * *